United States Patent
Charbonneau et al.

(10) Patent No.: US 8,973,405 B2
(45) Date of Patent: Mar. 10, 2015

(54) APPARATUS, SYSTEMS AND METHODS FOR REDUCING FOAMING DOWNSTREAM OF A SUBMERGED COMBUSTION MELTER PRODUCING MOLTEN GLASS

(71) Applicant: Johns Manville, Denver, CO (US)

(72) Inventors: Mark William Charbonneau, Lakewood, CO (US); Kevin Patrick McHugh, Littleton, CO (US)

(73) Assignee: Johns Manville, Denver, CO (US)

( * ) Notice: Subject to any disclaimer, the term of this patent is extended or adjusted under 35 U.S.C. 154(b) by 191 days.

(21) Appl. No.: 13/633,998

(22) Filed: Oct. 3, 2012

(65) Prior Publication Data

US 2014/0090419 A1  Apr. 3, 2014

(51) Int. Cl.
C03B 5/225  (2006.01)
C03B 5/16  (2006.01)

(52) U.S. Cl.
USPC .................. 65/134.5; 65/135.1; 65/346

(58) Field of Classification Search
CPC .......... C03B 5/16; C03B 5/225; C03B 5/235; C03B 5/2353
USPC ..................... 65/134.1–136.4, 346
See application file for complete search history.

(56) References Cited

U.S. PATENT DOCUMENTS

| | | | |
|---|---|---|---|
| 1,597,440 A * | 8/1926 | Ferngren | 65/90 |
| 1,716,433 A | 6/1929 | McKelvey et al. | |
| 1,989,103 A | 1/1935 | McKelvey et al. | |
| 2,174,533 A | 10/1939 | See et al. | |
| 2,118,479 A | 1/1940 | McCaskey | |
| 2,269,459 A | 1/1942 | Kleist | |
| 2,432,942 A | 12/1947 | See et al. | |
| 2,455,907 A | 1/1948 | Slayter | |
| 2,679,749 A | 6/1954 | Poole | |
| 2,718,096 A | 9/1955 | Henry et al. | |
| 2,773,545 A | 12/1956 | Petersen | |

(Continued)

FOREIGN PATENT DOCUMENTS

| | | |
|---|---|---|
| EP | 0 181 248 B1 | 10/1989 |
| EP | 1 337 789 B1 | 12/2004 |

(Continued)

OTHER PUBLICATIONS

"Glass Technologies—The Legacy of a Successful Public-Private Partnership", 2007, U.S. Department of Energy, pp. 1-32.

(Continued)

*Primary Examiner* — Lisa Herring
(74) *Attorney, Agent, or Firm* — Robert D. Touslee

(57) ABSTRACT

Apparatus including a flow channel defined by a floor, roof, and sidewall structure connecting the floor and roof. One or more combustion burners is positioned in either the roof, the sidewall structure, or both, and transfer heat to a molten mass of glass containing bubbles having a bubble atmosphere flowing through the flow channel. The burners contribute to formation of a channel atmosphere above the molten glass. Apparatus includes a device, at least a portion of which is positionable under a level of the molten glass in the flow channel, configured to emit a composition into the molten glass under the level to intimately contact the composition with the molten glass and bubbles therein. The composition diffuses into the bubbles to form modified atmosphere bubbles sufficiently different from the channel atmosphere to increase diffusion of a species in the channel atmosphere into the modified atmosphere bubbles.

16 Claims, 9 Drawing Sheets

(56) References Cited

U.S. PATENT DOCUMENTS

| | | |
|---|---|---|
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterflich et al. |
| 3,104,947 A | 9/1963 | Switzer et al. |
| 3,160,578 A | 12/1964 | Saxton et al. |
| 3,165,452 A | 1/1965 | Williams |
| 3,170,761 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,245,769 A | 4/1966 | Eck et al. |
| 3,248,205 A | 4/1966 | Dolf et al. |
| 3,260,587 A | 7/1966 | Dolf et al. |
| 3,268,313 A | 8/1966 | Burgman et at |
| 3,285,834 A | 11/1966 | Guerrieri et al. |
| 3,294,512 A | 12/1966 | Penberthy |
| 3,325,298 A | 6/1967 | Brown |
| 3,385,686 A | 5/1968 | Plumat et ai |
| 3,402,026 A | 9/1968 | Garrett et al. |
| 3,407,805 A | 10/1968 | Bougard |
| 3,407,862 A | 10/1968 | Mustian, Jr. |
| 3,414,396 A * | 12/1968 | Brichard .................. 65/134.5 |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,599 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,600,425 A * | 7/1986 | Krumwiede et al. ............ 65/178 |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,882,736 A | 11/1989 | Pieper |
| 4,886,539 A | 12/1989 | Gerutti et al. |
| 4,919,700 A | 4/1990 | Pecoraro et al. |
| 4,927,886 A | 5/1990 | Backderf et al. |
| 4,953,376 A | 9/1990 | Merlone |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Gay et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |

(56) References Cited

U.S. PATENT DOCUMENTS

| | | | |
|---|---|---|---|
| 6,039,787 A | 3/2000 | Edlinger | |
| 6,041,622 A * | 3/2000 | Duchateau et al. | 65/134.4 |
| 6,045,353 A | 4/2000 | VonDrasek et al. | |
| 6,068,468 A | 5/2000 | Phillipe et al. | |
| 6,071,116 A | 6/2000 | Phillipe et al. | |
| 6,074,197 A | 6/2000 | Phillippe | |
| 6,077,072 A | 6/2000 | Marin et al. | |
| 6,085,551 A * | 7/2000 | Pieper et al. | 65/134.1 |
| 6,109,062 A | 8/2000 | Richards | |
| 6,113,389 A | 9/2000 | Joshi et al. | |
| 6,116,896 A | 9/2000 | Joshi et al. | |
| 6,123,542 A | 9/2000 | Joshi et al. | |
| 6,126,438 A | 10/2000 | Joshi et al. | |
| 6,154,481 A | 11/2000 | Sorg et al. | |
| 6,156,285 A | 12/2000 | Adams et al. | |
| 6,171,100 B1 | 1/2001 | Joshi et al. | |
| 6,178,777 B1 | 1/2001 | Chenoweth | |
| 6,183,848 B1 | 2/2001 | Turner et al. | |
| 6,210,151 B1 | 4/2001 | Joshi et al. | |
| 6,210,703 B1 | 4/2001 | Novich | |
| 6,237,369 B1 | 5/2001 | LeBlanc et al. | |
| 6,241,514 B1 | 6/2001 | Joshi et al. | |
| 6,244,197 B1 | 6/2001 | Coble | |
| 6,244,857 B1 | 6/2001 | VonDrasek et al. | |
| 6,247,315 B1 | 6/2001 | Marin et al. | |
| 6,250,136 B1 | 6/2001 | Igreja | |
| 6,250,916 B1 | 6/2001 | Phillipe et al. | |
| 6,274,164 B1 | 8/2001 | Novich | |
| 6,276,924 B1 | 8/2001 | Joshi et al. | |
| 6,276,928 B1 | 8/2001 | Joshi et al. | |
| 6,293,277 B1 | 9/2001 | Panz et al. | |
| 6,314,760 B1 | 11/2001 | Chenoweth | |
| 6,314,896 B1 | 11/2001 | Marin et al. | |
| 6,332,339 B1 | 12/2001 | Kawaguchi et al. | |
| 6,334,337 B1 * | 1/2002 | Macedo et al. | 65/134.5 |
| 6,338,337 B1 | 1/2002 | Panz et al. | |
| 6,344,747 B1 | 2/2002 | Lunghofer et al. | |
| 6,357,264 B1 | 3/2002 | Richards | |
| 6,386,271 B1 | 5/2002 | Kawamoto et al. | |
| 6,418,755 B2 | 7/2002 | Chenoweth | |
| 6,422,041 B1 | 7/2002 | Simpson et al. | |
| 6,454,562 B1 | 9/2002 | Joshi et al. | |
| 6,460,376 B1 | 10/2002 | Jeanvoine et al. | |
| 6,536,238 B2 | 3/2003 | Kawaguchi et al. | |
| 6,536,651 B2 | 3/2003 | Ezumi et al. | |
| 6,558,606 B1 | 5/2003 | Kulkarni et al. | |
| 6,578,779 B2 | 6/2003 | Dion | |
| 6,660,106 B1 | 12/2003 | Babel et al. | |
| 6,694,791 B1 | 2/2004 | Johnson et al. | |
| 6,701,617 B2 | 3/2004 | Li et al. | |
| 6,705,118 B2 | 3/2004 | Simpson et al. | |
| 6,708,527 B1 | 3/2004 | Ibarlucea et al. | |
| 6,711,942 B2 | 3/2004 | Getman et al. | |
| 6,715,319 B2 | 4/2004 | Barrow et al. | |
| 6,722,161 B2 | 4/2004 | LeBlanc | |
| 6,736,129 B1 | 5/2004 | Smith | |
| 6,739,152 B2 | 5/2004 | Jeanvoine et al. | |
| 6,796,147 B2 | 9/2004 | Borysowicz et al. | |
| 6,797,351 B2 | 9/2004 | Kulkarni et al. | |
| 6,854,290 B2 | 2/2005 | Hayes et al. | |
| 6,857,999 B2 | 2/2005 | Jeanvoine | |
| 6,883,349 B1 | 4/2005 | Jeanvoine | |
| 6,918,256 B2 | 7/2005 | Gutmark et al. | |
| 7,027,467 B2 | 4/2006 | Baev et al. | |
| 7,116,888 B1 | 10/2006 | Aitken et al. | |
| 7,134,300 B2 | 11/2006 | Hayes et al. | |
| 7,168,395 B2 | 1/2007 | Engdahl | |
| 7,231,788 B2 | 6/2007 | Karetta et al. | |
| 7,273,583 B2 | 9/2007 | Rue et al. | |
| 7,330,634 B2 | 2/2008 | Aitken et al. | |
| 7,383,698 B2 | 6/2008 | Ichinose et al. | |
| 7,392,668 B2 | 7/2008 | Adams et al. | |
| 7,428,827 B2 | 9/2008 | Maugendre et al. | |
| 7,441,686 B2 | 10/2008 | Odajima et al. | |
| 7,448,231 B2 | 11/2008 | Jeanvoine et al. | |
| 7,454,925 B2 | 11/2008 | DeAngelis et al. | |
| 7,509,819 B2 | 3/2009 | Baker et al. | |
| 7,565,819 B2 | 7/2009 | Jeanvoine et al. | |
| 7,578,988 B2 | 8/2009 | Jacques et al. | |
| 7,581,948 B2 | 9/2009 | Borders et al. | |
| 7,622,677 B2 | 11/2009 | Barberree et al. | |
| 7,624,595 B2 | 12/2009 | Jeanvoine et al. | |
| 7,748,592 B2 | 7/2010 | Koga et al. | |
| 7,767,606 B2 | 8/2010 | McGinnis et al. | |
| 7,778,290 B2 | 8/2010 | Sacks et al. | |
| 7,781,562 B2 | 8/2010 | Crawford et al. | |
| 7,802,452 B2 | 9/2010 | Borders et al. | |
| 7,832,365 B2 | 11/2010 | Hannum et al. | |
| 7,845,314 B2 | 12/2010 | Smith | |
| 7,855,267 B2 | 12/2010 | Crawford et al. | |
| 8,033,254 B2 | 10/2011 | Hannum et al. | |
| 8,279,899 B2 | 10/2012 | Kitabayashi | |
| 8,285,411 B2 | 10/2012 | Hull et al. | |
| 2002/0086077 A1 | 7/2002 | Noller et al. | |
| 2002/0134112 A1 | 9/2002 | Barrow et al. | |
| 2002/0152770 A1 | 10/2002 | Becher et al. | |
| 2002/0162358 A1 | 11/2002 | Jeanvoine et al. | |
| 2002/0166343 A1 * | 11/2002 | LeBlanc | 65/134.4 |
| 2003/0015000 A1 | 1/2003 | Hayes et al. | |
| 2003/0029197 A1 | 2/2003 | Jeanvoine et al. | |
| 2003/0037571 A1 | 2/2003 | Kobayashi et al. | |
| 2004/0131988 A1 * | 7/2004 | Baker et al. | 432/195 |
| 2004/0168474 A1 | 9/2004 | Jeanvoine et al. | |
| 2004/0224833 A1 | 11/2004 | Jeanvoine et al. | |
| 2005/0039491 A1 | 2/2005 | Maugendre et al. | |
| 2005/0103323 A1 | 5/2005 | Engdal | |
| 2005/0236747 A1 * | 10/2005 | Rue et al. | 266/217 |
| 2006/0000239 A1 | 1/2006 | Jeanvoine et al. | |
| 2006/0101859 A1 * | 5/2006 | Takagi et al. | 65/32.5 |
| 2006/0174655 A1 | 8/2006 | Kobayashi et al. | |
| 2006/0233512 A1 | 10/2006 | Aitken et al. | |
| 2006/0257097 A1 | 11/2006 | Aitken et al. | |
| 2006/0287482 A1 | 12/2006 | Crawford et al. | |
| 2006/0293494 A1 | 12/2006 | Crawford et al. | |
| 2006/0293495 A1 | 12/2006 | Crawford et al. | |
| 2007/0106054 A1 | 5/2007 | Crawford et al. | |
| 2007/0122332 A1 | 5/2007 | Jacques et al. | |
| 2007/0130994 A1 | 6/2007 | Boratav et al. | |
| 2007/0212546 A1 | 9/2007 | Jeanvoine et al. | |
| 2007/0220922 A1 | 9/2007 | Bauer et al. | |
| 2008/0035078 A1 | 2/2008 | Li | |
| 2008/0227615 A1 | 9/2008 | McGinnis et al. | |
| 2008/0256981 A1 | 10/2008 | Jacques et al. | |
| 2008/0276652 A1 | 11/2008 | Bauer et al. | |
| 2008/0293857 A1 | 11/2008 | Crawford et al. | |
| 2009/0038342 A1 * | 2/2009 | Pitbladdo | 65/27 |
| 2009/0042709 A1 | 2/2009 | Jeanvoine et al. | |
| 2009/0220899 A1 | 9/2009 | Spangelo et al. | |
| 2010/0064732 A1 | 3/2010 | Jeanvoine et al. | |
| 2010/0087574 A1 | 4/2010 | Crawford et al. | |
| 2010/0089383 A1 | 4/2010 | Cowles | |
| 2010/0120979 A1 | 5/2010 | Crawford et al. | |
| 2010/0143601 A1 | 6/2010 | Hawtof et al. | |
| 2010/0227971 A1 | 9/2010 | Crawford et al. | |
| 2010/0236323 A1 | 9/2010 | D'Angelico et al. | |
| 2010/0300153 A1 | 12/2010 | Zhang et al. | |
| 2010/0304314 A1 | 12/2010 | Rouchy et al. | |
| 2010/0307196 A1 | 12/2010 | Richardson | |
| 2010/0326137 A1 | 12/2010 | Rouchy et al. | |
| 2011/0054091 A1 | 3/2011 | Crawford et al. | |
| 2011/0061642 A1 | 3/2011 | Rouchy et al. | |
| 2011/0088432 A1 * | 4/2011 | Purnode et al. | 65/181 |
| 2011/0107670 A1 | 5/2011 | Galley et al. | |
| 2011/0236846 A1 | 9/2011 | Rue et al. | |
| 2011/0308280 A1 | 12/2011 | Huber | |
| 2012/0077135 A1 | 3/2012 | Charbonneau | |
| 2013/0086944 A1 | 4/2013 | Shock et al. | |
| 2013/0086949 A1 | 4/2013 | Charbonneau | |
| 2013/0086950 A1 | 4/2013 | Huber et al. | |
| 2013/0086951 A1 | 4/2013 | Charbonneau et al. | |
| 2013/0086952 A1 | 4/2013 | Charbonneau et al. | |
| 2013/0219968 A1 * | 8/2013 | De Angelis et al. | 65/134.4 |

(56) References Cited

U.S. PATENT DOCUMENTS

FOREIGN PATENT DOCUMENTS

| EP | 1 986 966 B1 | 4/2010 |
| EP | 2 397 446 A2 | 12/2011 |
| EP | 2 433 911 A1 | 3/2012 |
| EP | 2 578 548 A2 | 4/2013 |
| GB | 191301772 | 0/1914 |
| GB | 191407633 | 0/1914 |
| GB | 164073 A | 5/1921 |
| GB | 1449439 | 9/1976 |
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |

OTHER PUBLICATIONS

Rue, "Energy-Efficient Glass tvleiting—The Next Generation Melter", Gas Technology Institute, Project No. 20621 Final Report, 2008.
U.S. Appl. No. 12/817,754, filed Jun. 17, 2010, Huber.
U.S. Appl. No. 12/888,970, filed Sep. 23, 2010, Charbonneau.
U.S. Appl. No. 13/267,990, filed Oct. 7, 2010, Shock et al.
U.S. Appl. No. 13/268,028, filed Oct. 7, 2010, Charbonneau.
U.S. Appl. No. 13/268,065, filed Oct. 7, 2010, Charbonneau et al.
U.S. Appl. No. 13/268,098, filed Oct. 7, 2010, Huber et al.
U.S. Appl. No. 13/268,130, filed Oct. 7, 2010, Charbonneau et al.
U.S. Appl. No. 13/458,211, filed Apr. 27, 2012, Mobley et al.
U.S. Appl. No. 13/493,170, filed Jun. 11, 2012, Huber et al.
U.S. Appl. No. 13/403,219, filed Jun. 11, 2012, Charbonneau.
"Glass Industry of the Future", Sep. 30, 2008, United States Department of Energy, report 02-GA50113-03, pp. 1-17.
Stevenson, "Foam Engineering: Fundamentals and Applications", Published 2012, Chapter 16, John Wiley & Sons, Ltd.
Clare et al., "Density and Surface Tension of Borate Containing Silicate Glass Melts", Glass Technology, 2003, 44 (2), pp. 59-62.
Seward, T.P., "Modeling of Glass Making Processes for Improved Efficiency", DE-FG07-96EE41262, Final Report, Mar. 31, 2003.
Conradt et al, Foaming behaviour on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 1991, 74(3), pp. 551-555.
Kim et al., "Foaming in Glass Melts Produced by Sodium Sulfate Decomposition under Ramp Conditions", Journal of the American Ceramic Society, 1992, 75(11), pp. 2959-2963.
Kim et al., "Effect of Furnace Atmosphere on E-glass Foaming", Journal of Non-Crystalline Solids, 2006, 352(50/51), pp. 5287-5295.
Van Limpt, et al., "Modelling the evaporation of boron species, Alkali-free borosilicate glass melts", Glass Technology—European Journal of Glass Science and Technology, Part 1, Jun. 2011, 52(3), pp. 77-87.
U.S. Appl. No. 13/540,771, filed Jul. 3, 2012, Charbonneau et al.
U.S. Appl. No. 13/633,979, filed Oct. 3, 2012, Charbonneau et al.
U.S. Appl. No. 13/644,058, filed Oct. 3, 2012, Charbonneau et al.
U.S. Appl. No. 13/644,104, filed Oct. 3, 2012, Charbonneau et al.
U.S. Appl. No. 13/644,039, filed Oct. 3, 2012, Shock et al.
"AccuTru Temperature Measurement," AccuTru International Corporation, 2003.
"Glas Melting Technology—A Technical and Economic Assessment," 2004, U.S. Department of Energy, pp. 1-292.
"Canty Process Technology", brochure, date unknown, in Apr. 2012 at American Institute of Chemical Engineers, Spring Meeting, Houston, TX.
Olabin, V.M. et al., "Submerged Combustion Furnace for Glass Melts," Ceramic Engineering and Science Proceedings, Jan. 1, 1996, pp. 84-92, vol. 17—No. 2, American Ceramic Society Inc., US.
Higley, BA, Glass Melter System Technologies for Vitrification of High-Sodium Content Low-Level Radioactive, Liquid Waters—Phase I: SBS Demonstration With Simulated Low-Level Waste—Final Test Report, Westinghouse Hanford Company.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
AccuTru International Corporation, AccuTru International SVS Advanced Temperature Measurement System, Jun. 2003.

\* cited by examiner

APPARATUS, SYSTEMS AND METHODS FOR REDUCING FOAMING DOWNSTREAM OF A SUBMERGED COMBUSTION MELTER PRODUCING MOLTEN GLASS

CROSS-REFERENCE TO RELATED APPLICATIONS

This application may be related to the following United States non-provisional patent applications assigned to the assignee of the present application which are all incorporated by reference herein: U.S. Ser. No. 12/817,754, filed Jun. 17, 2010; U.S. Ser. Nos. 13/267,990, 13/268,028, 13/268,098, and 13/268,130, all four filed Oct. 7, 2011; U.S. Ser. No. 13/458,211, filed Apr. 27, 2012; U.S. Ser. Nos. 13/493,170 and 13/493,219, both filed Jun. 11, 2012; U.S. Ser. No. 13/540,771, filed Jul. 3, 2012. U.S. patent applications identified are being filed on even date herewith.

BACKGROUND INFORMATION

1. Technical Field

The present disclosure relates generally to the field of combustion furnaces and methods of use to produce glass, and more specifically to systems and methods for reducing foam or its impact during manufacture of glass using submerged combustion melters.

2. Background Art

Submerged combustion melting (SCM) involves melting glass batch materials to produce molten glass by passing oxygen, oxygen-air mixtures or air along with a liquid, gaseous fuel, or particulate fuel in the glass batch, directly into a molten pool of glass usually through burners submerged in a glass melt pool. The introduction of high flow rates of oxidant and fuel into the molten glass, and the expansion of the gases cause rapid melting of the glass batch and much turbulence.

One drawback to submerged combustion is the tendency of the molten glass to foam. The foam may stabilize in a top bubble layer when the molten mass is routed through conventional conditioning and/or distribution channels/systems downstream of the submerged combustion melter. The bubble layer may impede the ability to apply heat to the glass using combustion burners to achieve or maintain temperature and compositional homogeneity of the molten glass, and may also impede the rate at which further bubbles in the melt rise and thus effect expulsion of the bubbles and mass flow rate of the melt in the channels. In extreme cases, the foam generated may interfere with the traditional energy application methods employed, which may cause systems to require shutdown, maintenance and may result in a process upset. Attempts to reduce the foam problem through process adjustments have not met with complete success in reducing foam to an acceptable amount.

It would be an advance in the glass manufacturing art if foam could be reduced, or the effect of the foam reduced, in equipment downstream of a submerged combustion melter during processing of molten glass manufactured using a submerged combustion melter and methods.

SUMMARY

In accordance with the present disclosure, apparatus, systems and methods are described which reduce or overcome one or more of the above problems.

A first aspect of the disclosure is an apparatus comprising:

a flow channel defined by a floor, a roof, and a sidewall structure connecting the floor and roof;

one or more combustion burners positioned in either the roof, the sidewall structure, or both, and positioned to transfer heat to a molten mass of glass containing bubbles having a bubble atmosphere flowing through the flow channel, the burners contributing to formation of a channel atmosphere above the molten glass; and a device, at least a portion of which is positionable sufficiently under a level of the molten glass in the flow channel and configured to emit a composition into the molten glass under the level so as to intimately contact the composition with the molten glass and at least some of the bubbles therein, at least some of the composition diffusing into the intimately contacted bubbles to form modified atmosphere bubbles sufficiently different from the channel atmosphere to increase diffusion of a species in the channel atmosphere into the modified atmosphere bubbles, wherein when at least some of the modified atmosphere bubbles are subsequently exposed to the channel atmosphere, a portion of the channel atmosphere diffuses into the modified atmosphere bubbles.

A second aspect of the disclosure is a system comprising:

a submerged combustion melter comprising a floor, a roof, a wall structure connecting the floor and roof, a melting zone being defined by the floor, roof and wall structure, and one or more a burners, at least some of which are positioned to direct combustion products into the melting zone under a level of molten glass in the melting zone and form a turbulent molten glass, the melter vessel comprising a batch feeder attached to the wall or roof above the level, and an exit end comprising a melter exit structure for discharging the molten glass, the melter exit structure fluidly and mechanically connecting the melter vessel to a flow channel downstream of the melter, the melter configured to produce an initial foamy molten glass comprising bubbles having a bubble atmosphere, at least some of the bubbles forming a bubble layer on top of the foamy molten glass;

the flow channel defined by a flow channel floor, a flow channel roof, and a flow channel sidewall structure connecting the floor and roof;

one or more flow channel combustion burners positioned in either the flow channel roof, the flow channel sidewall structure, or both, and positioned to transfer heat to the foamy molten glass containing bubbles flowing through the flow channel, the flow channel burners contributing to formation of a channel atmosphere above the molten glass; and a device, at least a portion of which is positionable sufficiently under a level of the molten glass in the flow channel and configured to emit a composition into the foamy molten glass under the level so as to intimately contact the composition with the foamy molten glass and at least some of the bubbles therein, at least some of the composition diffusing into the intimately contacted bubbles to form modified atmosphere bubbles, wherein when at least some of the modified atmosphere bubbles are subsequently exposed to the channel atmosphere, a portion of the channel atmosphere diffuses into the modified atmosphere bubbles.

A third aspect of the disclosure is a method comprising:

a) routing an initial foamy molten glass into a flow channel downstream of a submerged combustion melter, the initial foamy molten glass comprising bubbles having a bubble atmosphere, at least some of the bubbles forming a bubble layer on top of the foamy molten glass, the flow channel defined by floor, a roof, and a sidewall structure connecting the floor and roof;

b) heating the foamy molten glass using one or more combustion burners positioned in either the roof, the sidewall structure, or both, and positioned to transfer heat to the molten mass of glass containing bubbles flowing through the flow channel, the burners contributing to formation of a channel atmosphere above the foamy molten glass;

c) intimately contacting the initial molten glass and at least some of the bubbles therein with a composition discharged from a device, at least a portion of which is positionable sufficiently under a level of the molten glass in the flow channel and configured to emit the composition so that at least some of the composition diffuses into the contacted bubbles to form modified atmosphere bubbles, d) contacting at least some of the modified atmosphere bubbles with the channel atmosphere, at least a portion of the channel atmosphere diffusing into the modified atmosphere bubbles.

A fourth aspect of the disclosure is a method comprising:

a) routing an initial foamy molten glass into a flow channel downstream of a submerged combustion melter, the initial foamy molten glass comprising bubbles having a bubble atmosphere, at least some of the bubbles forming a bubble layer on top of the foamy molten glass, the flow channel defined by floor, a roof, and a sidewall structure connecting the floor and roof;

b) heating the foamy molten glass using one or more combustion burners positioned in either the roof, the sidewall structure, or both, and positioned to transfer heat to the molten mass of glass containing bubbles flowing through the flow channel, the burners contributing to formation of a channel atmosphere above the foamy molten glass;

c) intimately contacting the initial molten glass and at least some of the bubbles therein with a gas selected from the group consisting of hydrogen, helium, steam, nitrogen, oxides of nitrogen, oxides of carbon, oxides of sulfur, argon, xenon, krypton, and mixtures and combinations thereof discharged from one or more conduits inserted through the roof, at least a portion of the conduits positioned sufficiently under a level of the molten glass in the flow channel and configured to emit the composition so that at least some of the composition diffuses into the contacted bubbles to form modified atmosphere bubbles; and d) contacting at least some of the modified atmosphere bubbles with the channel atmosphere, at least a portion of the channel atmosphere diffusing into the modified atmosphere bubbles.

Apparatus, systems and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
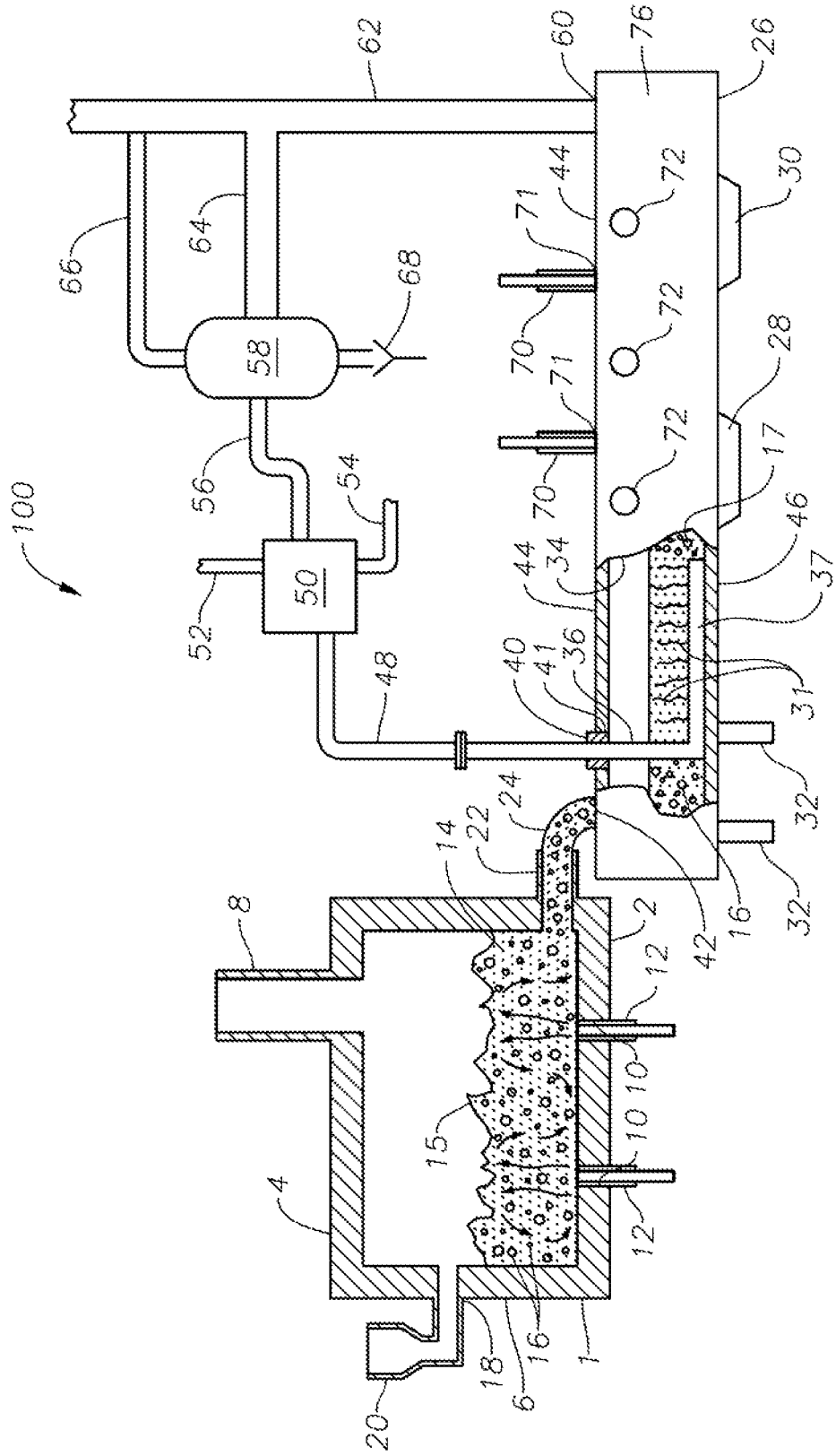
FIG. 1 is a schematic side elevation view, partially in cross-section with some portions cut away, of one apparatus and system embodiment in accordance with this disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. Published Patent Applications and U.S. Patents referenced herein are hereby explicitly incorporated herein by reference. In the event definitions of terms in the referenced Patents and Patent Applications conflict with how those terms are defined in the present application, the definitions for those terms that are provided in the present application shall be deemed controlling.

As explained briefly in the Background, one drawback to submerged combustion is the tendency of the molten glass to foam, either from glass-forming reactions, combustion products, or both. The foam may stabilize in a top layer when the molten mass is routed through equipment downstream of the submerged combustion melter, such as forehearths, conditioning channels, distribution channels, and the like. Attempts to reduce the foam problem through process adjustments have not met with complete success in reducing foam to an acceptable amount.

Applicants have discovered apparatus, systems and methods that may reduce or eliminate such problems.

Various terms are used throughout this disclosure. "Submerged" as used herein means that combustion gases emanate from combustion burners under the level of the molten glass; the burners may be floor-mounted, wall-mounted, or in melter embodiments comprising more than one submerged combustion burner, any combination thereof (for example, two floor mounted burners and one wall mounted burner). "SC" as used herein means "submerged combustion" unless otherwise noted.

The terms "foam" and "foamy" include froths, spume, suds, heads, fluffs, fizzes, lathers, effervesces, layer and the like. The term "bubble" means a thin, shaped, gas-filled film of molten glass. The bubble shape may be spherical, hemispherical, tetrahedral, rectangular, ovoid, and the like. The gas or "bubble atmosphere" in the gas-filled bubbles produced during submerged combustion heating of glass forming materials may comprise oxygen or other oxidants, nitrogen, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles produced during submerged combustion heating of glass forming materials may include solids particles, for example soot particles, either in the film, the gas inside the film, or both. Bubbles produced during submerged combustion heating of glass forming materials, without any additives or treatment compositions added to the melt or above the melt may be referred to as "SC bubbles."

The term "composition" includes one or more gases, one or more liquids that may evolve a gas or become gaseous under the high temperature conditions associated with submerged combustion melting, one or more particulate solids, and combinations of thereof. The terms "intimately contact" and "intimately contacting" mean the composition is not simply present in the head space above the molten glass and foamy layer floating on top thereof, but is present in such a manner so that the composition has a greater chance of diffusing into the bubbles of the foam and changing the bubble atmosphere.

As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants may be supplied from a pipeline, cylinders, storage facility, cryogenic air separation unit, membrane permeation separator, or adsorption unit.

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of non-fuels therein, including oxidants, for purposes such as premixing the fuel with the oxidant, or atomizing liquid fuels. As used herein the term "fuel" includes gaseous fuels, liquid fuels, flowable solids, such as powdered carbon or particulate material, waste materials, slurries, and mixtures or other combinations thereof. When the fuel comprises gaseous fuel, the gaseous fuel may be selected from the group consisting of methane, natural gas, liquefied natural gas, propane, carbon monoxide, hydrogen, steam-reformed natural gas, atomized oil or mixtures thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

A "flow channel" defined by a floor, a roof, and a wall structure connecting the floor and roof may have any operable cross-sectional shape, for example, but not limited to, rectangular, oval, circular, trapezoidal, hexagonal, and the like, and flow path shape, for example, but not limited to, straight, zigzag, curved, and combinations thereof. In certain systems and processes the flow channel may be selected from the group consisting of a conditioning channel, a distribution channel, and a forehearth.

Conduits used in burners and devices for delivery of a composition useful in apparatus, systems and processes of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials for the glass-contact refractory, which may be present in SC melters and channel sections, and refractory burner blocks (if used) include fused zirconia ($ZrO_2$), fused cast AZS (alumina-zirconia-silica), rebonded AZS, or fused cast alumina ($Al_2O_3$). The melter, flow channel, composition delivery device, and burner geometry, and type of glass to be produced may dictate the choice of a particular material, among other parameters.

The terms "cooled" and "coolant" may include use of any heat transfer fluid and may be any gaseous, liquid, or some combination of gaseous and liquid composition that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain burners useful in apparatus, systems and processes of this disclosure may be fluid-cooled, and may include first and second concentric conduits, the first conduit fluidly connected at one end to a source of fuel, the second conduit fluidly connected to a source of oxidant, and a third substantially concentric conduit comprising a first end, a second end, and an internal surface, the internal surface of the third conduit forming, with an exterior surface of the second conduit, a secondary annulus external to a primary annulus between the first and second conduits. The first end of the third conduit may extend beyond the first end of the second conduit, the first end of the second conduit may extend beyond the first end of the first conduit, and the secondary annulus may be capped by an end cap connecting the first end of the second conduit and the first end of the third conduit.

In certain systems one or more of the non-submerged burners may comprise a fuel inlet conduit having an exit nozzle, the conduit and nozzle inserted into a cavity of a ceramic burner block, the ceramic burner block in turn inserted into either the roof or the wall structure, or both the roof and wall structure.

In certain systems, one or more of the non-submerged burners may be adjustable with respect to direction of flow of the combustion products. Adjustment may be via automatic, semi-automatic, or manual control. Certain system embodiments may comprise a burner mount that mounts the burner in the wall structure or roof of the channel comprising a refractory, or refractory-lined ball joint. Other burner mounts may comprise rails mounted in slots in the wall or roof. In yet other embodiments the non-submerged burners may be mounted outside of the melter or channel, on supports that allow adjustment of the combustion products flow direction. Useable supports include those comprising ball joints, cradles, rails, and the like.

As used herein the phrase "high momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second). As used herein the phrase "low momentum" combustion burners means burners configured to have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Certain system and process embodiments of this disclosure may include submerged combustion melters comprising fluid-cooled panels such as disclosed in assignee's co-pending U.S. Ser. No. 12/817,754, filed Jun. 17, 2010. In certain system and process embodiments, the submerged combustion melter may include one or more adjustable flame submerged combustion burners comprising one or more oxy-fuel combustion burners, such as described in assignee's co-pending U.S. Ser. No. 13/268,028, filed Oct. 7, 2011. In certain systems and processes, the submerged combustion melter may comprise a melter exit structure designed to minimize impact of mechanical energy, such as described is assignee's co-pending U.S. Ser. No. 13/458,211, filed Apr. 27, 2012. In certain systems and processes, the flow channel may comprise a series of sections, and may comprise one or more skimmers and/or impingement (high momentum) burners, such as described in assignee's co-pending U.S. Ser. No. 13/268,130, filed Oct. 7, 2011, and U.S. Ser. No. 13/493,170, filed Jun. 11, 2012. Certain systems and processes of the present disclosure may utilize temperature measurement and control schemes such as described in assignee's co-pending application U.S. Ser. No. 13/493,219, filed Jun. 11, 2012, and/or feed batch densification systems and methods as described in assignee's co-pending application U.S. Ser. No. 13/540,704, filed Jul. 3, 2012.

Certain system and method embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and methods of this disclosure may also measure and/or monitor feed rate of batch or other feed materials, such as glass batch, cullet, mat or wound roving, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, and combinations thereof, and may employ a control algorithm to control combustion temperature based on one or more of these input parameters.

Specific non-limiting apparatus, system and process embodiments in accordance with the present disclosure will now be presented in conjunction with FIGS. 1-12. The same numerals are used for the same or similar features in the various figures. In the views illustrated in FIGS. 1-10, it will be understood in each case that the figures are schematic in nature, and certain conventional features are not illustrated in order to illustrate more clearly the key features of each embodiment.

FIG. 1 is a schematic side elevation view, partially in cross-section with some portions cut away, of apparatus and system embodiment 100 in accordance with this disclosure. Illustrated schematically is a submerged combustion (SC) melter 1 fluidly and mechanically connected to a flow channel 26 downstream of melter 1 through an exit structure 22. (Exit structure 22 may be, for example, but not limited to, a fluid-cooled exit structure as described in assignee's pending U.S. Ser. No. 13/458,211, mentioned above.) SC melter 1 includes a floor 2, a roof or ceiling 4, a side wall structure 6, an exhaust stack 8, and one or more apertures 10 in floor 2 for corresponding one or more SC burners 12. It will be understood that one or more burners 12 may be mounted in sidewall structure 6. Roof-mounted burners (not illustrated) may also be included, for example for start-up. One or more burners 12 may be oxy/fuel burners. SC burners 12 produce a turbulent melt 14 comprising bubbles 16 having a bubble atmosphere. In general the atmosphere of the bubbles is about the same from bubble to bubble, but that is not necessarily so. One or more inlet ports 18 and batch feeders 20 maybe provided. Other feeds are possible, such as glass mat waste, wound roving, waste materials, and the like, such as disclosed in assignee's U.S. Ser. No. 12/888,970, filed Sep. 23, 2010 (published as 2012/0077135 on Mar. 29, 2012).

Figure 2A:
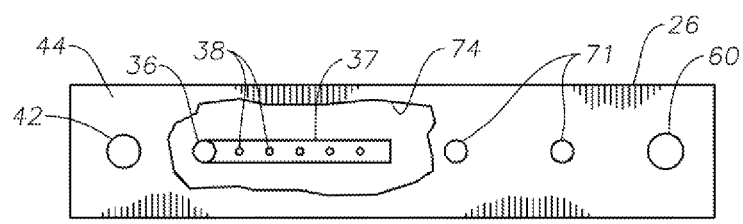
FIGS. 2A, 3A, and 4A are schematic plan views, with some portions cut away, of three apparatus embodiments in accordance with the present disclosure.

Still referring to FIG. 1, molten glass with entrained bubbles, 24, exits SC melter 1 through melter exit structure 22, and enters flow channel 26 though an access port 42. Flow channel may include one or more bushings 28, 30, for example when producing glass fiber (not illustrated). In accordance with the present disclosure, and as illustrated schematically with the aide of a cut-away portion 34 of flow channel 26, molten glass and entrained bubbles having a bubble atmosphere are intimately contacted with a composition 31 in flow channel 26. Composition 31 is illustrated schematically as being emitted from a generally horizontal extension conduit 37 having one or more holes, apertures, or orifices 38 (as illustrated in FIG. 2A). Extension conduit 37 lies adjacent an inside surface of floor 46 of flow channel 26, and along a central longitudinal axis of flow channel 26, although this particular configuration is not necessarily so. Extension conduit 37 fluidly and mechanically connects to a conduit 36 extending through a port, aperture, or hole 41 in flow channel roof 44. Conduit 36 is illustrated as substantially vertical, but this is but one of many possible arrangements. Conduit 36 may have an external diameter providing a secure fit in port 41, or conduit 36 may be secured in port 41 using a ceramic (or other high temperature material) collar 40. One or more optional conventional bubblers 32 may be employed in certain embodiments, for example, in conjunction with conduits 36, 37, or if extension conduit 37 becomes inoperable for some reason.

Figures 2B, 3B:
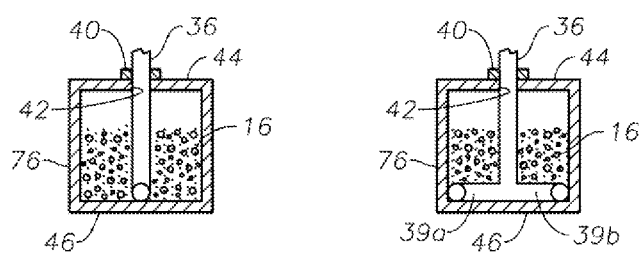
FIGS. 2B, 3B, and 4B are schematic end elevation cross-sectional views of the three apparatus embodiment of FIGS. 2A, 3A, and 4A.

Still referring to FIG. 1, flow channel 26 comprises in embodiment 100 a flow channel roof 44 and one or more gas exit ports 60, which may route extraneous gas and other material to a stack 62. Exit port 60 may also be sized to control the flow or composition of the atmosphere above the molten glass and foamy layer in the flow channel. (For example, a smaller size may provide some back pressure, while a larger size may allow higher gas velocities.) An optional recycle conduit 64 may be provided, routing extraneous material to a knock-out drum 58 having a drain 68, a gas purge line 66, and a recycle conduit 56. In one possible arrangement of many, recycle conduit 56 may route composition not diffused into bubbles in flow channel 26 back to a composition production unit 50, for example a nitrogen generation unit that generates a nitrogen-enriched gas steam that is routed through a primary supply conduit 48, conduit 36, and conduit 37. One or more waste stream conduits, 53, 54 may be provided to discard or route rejected material. For example, if composition production unit 50 is a nitrogen generation unit using air as feed, the unit may be fed air through a conduit 52, and produce one or more reject streams 54 enriched in oxygen. This enriched oxygen stream may be useful in one or more oxy/fuel burners, either in the SC melter, the flow channel, or both. As another example, composition may simply be provided through one or more cylinders, pipelines, or other source. In either embodiment, the composition (or at least a portion thereof) diffuses into bubbles 16 in flow channel 26, and produces modified atmosphere bubbles 17 in the molten glass in flow channel 26. Modified atmosphere bubbles 17 subsequently contact the gas atmosphere above the molten glass produced by one or more flow channel burners 70 in embodiment 100. As illustrated in FIG. 1, flow channel burners 70 may be inserted through apertures 71 in roof 44 of flow channel 26. Flow channel burners may also be, or in the alternative may be inserted through apertures 72 in flow channel 26 sidewall structure 76. Due to concentration differences of species in modified atmosphere bubbles 17 and the flow channel atmosphere in part produced by flow channel burners 70, a portion of the flow channel atmosphere diffuses into the modified atmosphere bubbles, causing the bubbles to expand and eventually break. Alternatively, gas species in the modified atmosphere bubbles may preferentially diffuse out of modified atmosphere bubbles 17 and into the flow channel atmosphere. In ether case, the result should be a reduction in bubbles, and therefore foam in flow channel 26. FIG. 2A is a schematic plan view, with some portions cut away as indicated at 74, of flow channel 26 of embodiment 100, while FIG. 2B is an end elevation schematic view.

Figure 3A:
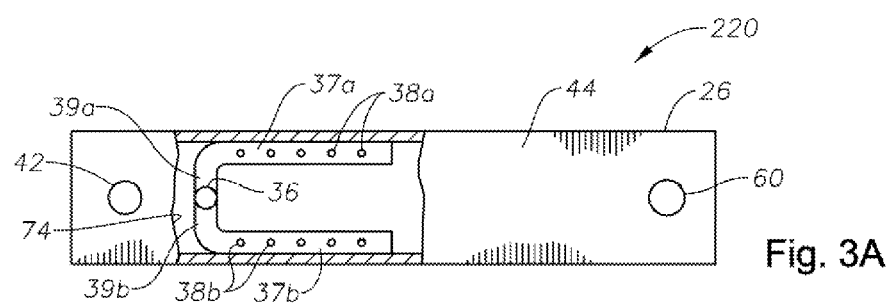
Figure 4A:
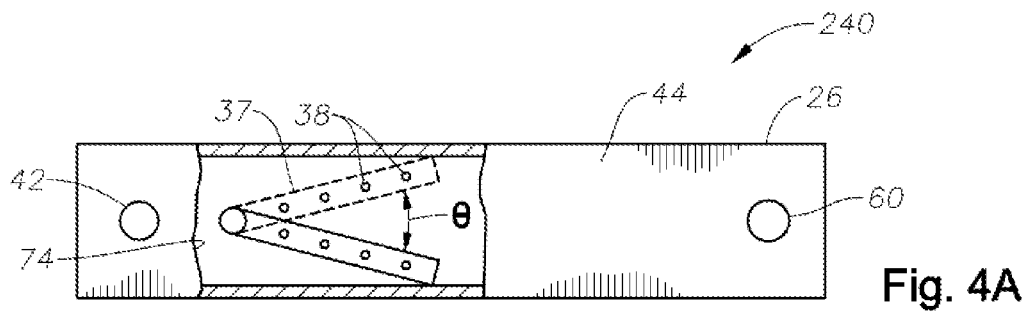
Figure 4B:
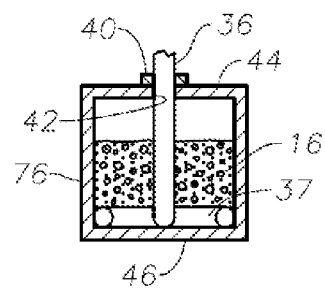

FIGS. 3A and 4A are schematic plan views, with portions cut-away, of flow channel embodiments 220 and 240, respectively. Embodiment 220 differs from flow channel 26 of system embodiment 100 by comprising a substantially vertical conduit 36, two substantially horizontal extension conduits 39a, 39b forming a "T" with substantially vertical conduit 36, each substantially horizontal extension conduit 39a, 39b further having a secondary, substantially horizontal conduit 37a, 37b, each secondary, substantially horizontal conduit 37a, 37b having at least one aperture 38a, 38b for emitting the composition. Embodiment 240 illustrated schematically in FIG. 4A is characterized by having a substantially horizontal extension conduit 37 variable by an angle "θ" that may range from 0 to +/−45 degrees. Conduit 37 may be installed at this angle, or may be movable through that angle after installation. FIGS. 3B and 4B are cross-sectional end elevation views of embodiments 220 and 240, respectively.

Figure 5A:
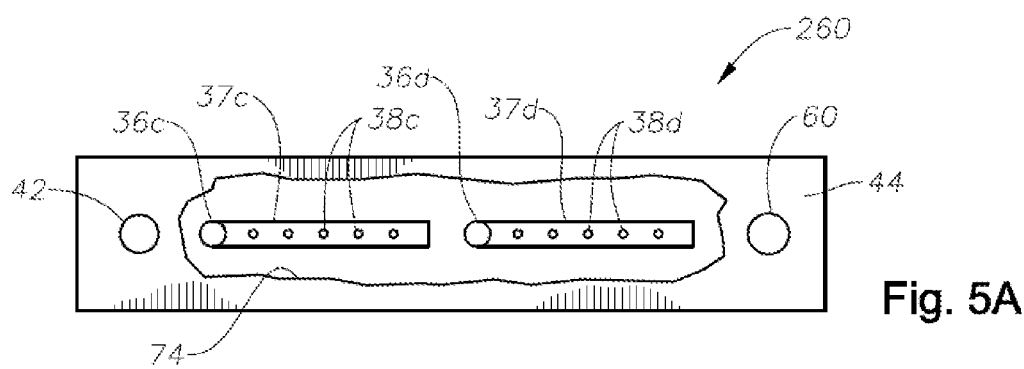
FIG. 5A is a schematic plan view, with some portions cut away, of another apparatus embodiment in accordance with the present disclosure.
Figure 5B:
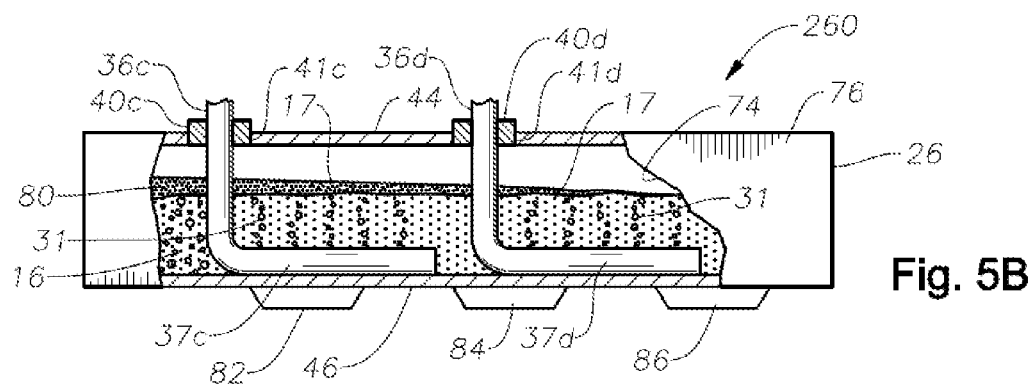
FIG. 5B is a schematic end elevation cross-sectional view of the apparatus embodiment of FIG. 5A.

FIG. 5A is a schematic plan view, with some portions cut away, of another apparatus embodiment 260 in accordance with the present disclosure, and FIG. 5B is a schematic cross-sectional side elevation view of apparatus embodiment 260. Embodiment 260 features two substantially vertical conduits 36c, 36d each separately fluidly and mechanically connected to a substantially horizontal extension conduit 37c, 37d, each of the latter having a plurality of apertures, holes, or orifices 38c, 38d for emitting composition. Embodiment 260 comprises respective holes or apertures 41c, 41d and collars 40c, 40d, as in embodiment 100. FIG. 5B illustrates a bubble layer 80, composition 31 bubbling from orifices 38c, 38d and interacting intimately with bubbles 16 in molten glass to form modified atmosphere bubbles 17. Embodiment 260 may have three bushings 82, 84, 86 for producing fiber.

Figure 6A:
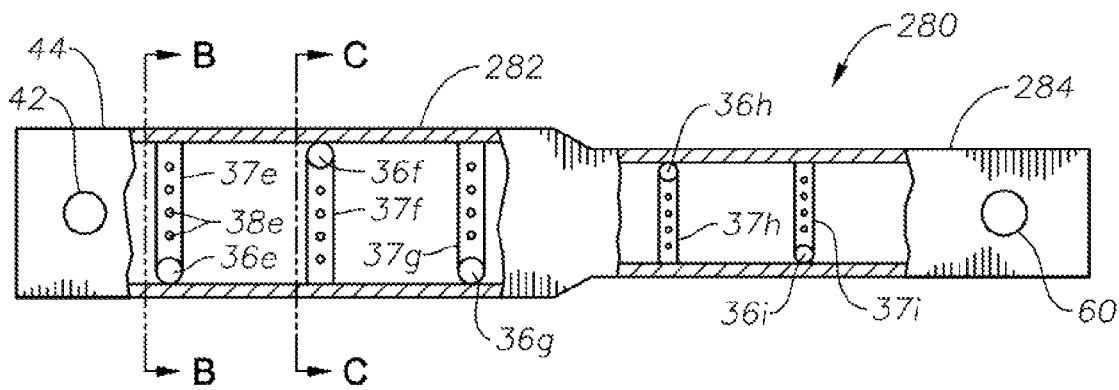
FIG. 6A is a schematic plan view, with portions cut away, of another embodiment of an apparatus in accordance with this disclosure.
Figure 6B:
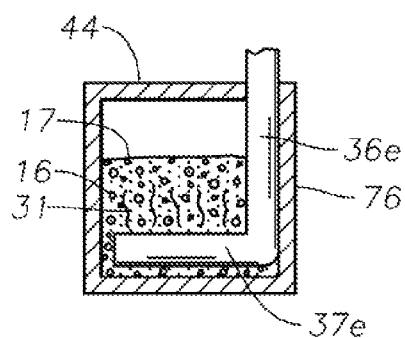
FIGS. 6B and 6C are schematic cross-sectional views along lines B-B and C-C, respectively, in FIG. 6A.
Figure 6C:
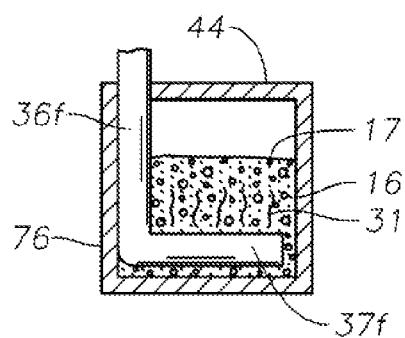

FIG. 6A is a schematic plan view, with portions cut away, of another flow channel embodiment 280 in accordance with this disclosure, and FIGS. 6B and 6C are schematic cross-sectional views along lines B-B and C-C, respectively, in FIG. 6A. Flow channel embodiment 280 includes a first section 282 and a second section 284 that is narrower than first section 282. Flow channel embodiment includes alternating substantially vertical conduits 36e, 36f, 36g, 36h, and 36i as illustrated, alternating from right to left. In other embodiments, the substantially vertical conduits 36 may all be on the same side of flow channel 280, or randomly positioned side to side. Each substantially vertical conduit is fluidly and mechanically connected to a respective substantially horizontal extension 37e, 37f, 37g, 37h, and 37i, with respective holes or orifices 38e, and so on. Sections 282 and 284 have flow channel widths W1 and W2, where W1>W2.

Figure 7A:
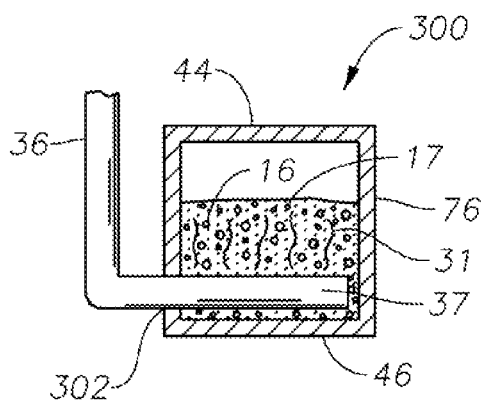
FIGS. 7A and 7B are schematic cross-sectional views of two other apparatus embodiments in accordance with the present disclosure.
Figure 7B:
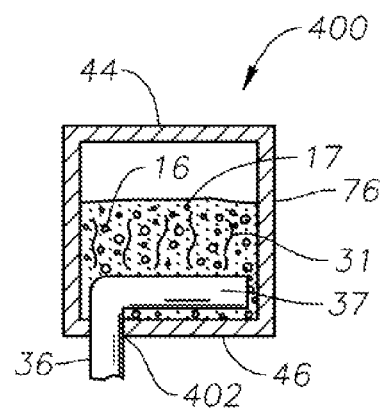

FIGS. 7A and 7B are schematic cross-sectional views of two other apparatus embodiments 300 and 400 in accordance with the present disclosure. Embodiment 300 is characterized by a substantially vertical conduit 36 fluidly and mechanically connected to a substantially horizontal extension conduit 37 through an aperture 302 in flow channel sidewall structure 76. Extension conduit 37 has a series of holes or apertures (not illustrated) for emitting composition 31 into molten glass, so as to intimately contact bubbles 16 and form modified atmosphere bubbles 17. Embodiment 400 is similar, but rather than an aperture through the flow channel sidewall, includes and aperture 402 through the flow channel floor 46.

Figure 8A:
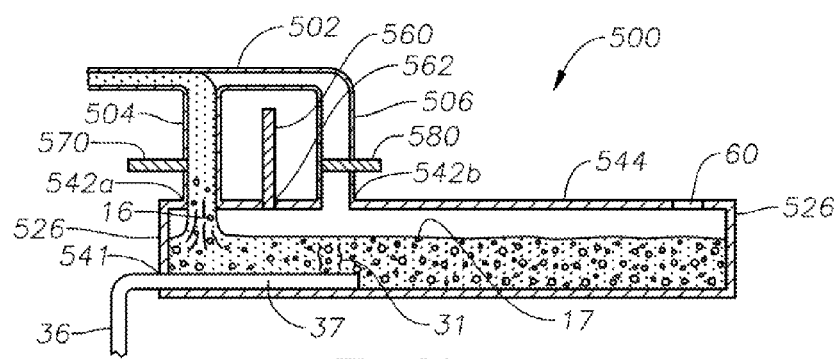
FIGS. 8A, 8B, and 8C are schematic side elevation views, partially in cross section, of another apparatus in accordance with the present invention.
Figure 8B:
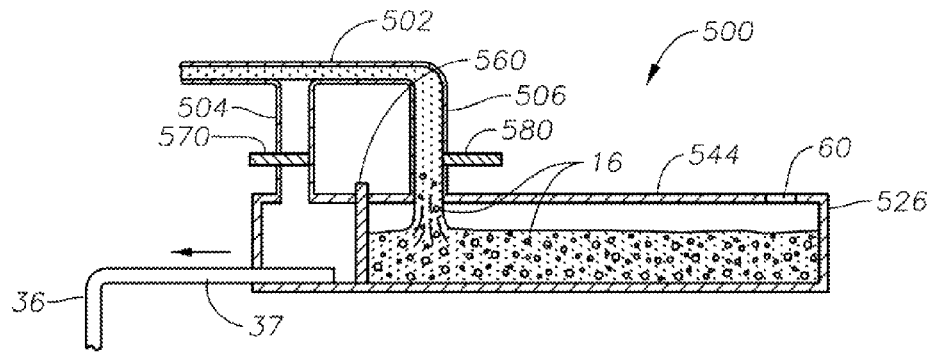
Figure 8C:
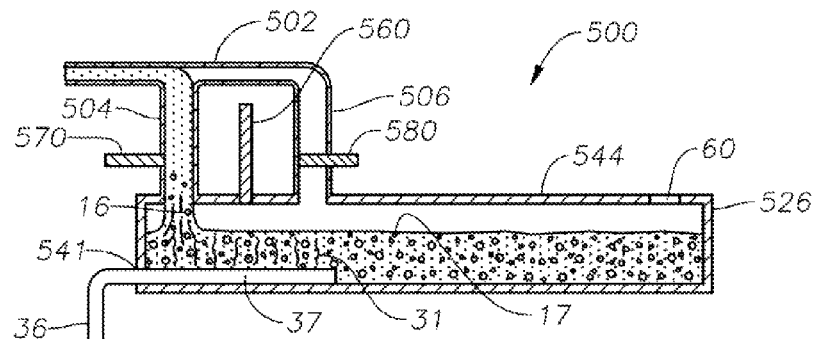

FIGS. 8A, 8B, and 8C are schematic side elevation views, partially in cross section, of a flow channel embodiment 500 in accordance with the present invention, illustrating how the configuration of embodiment 300 might be operated. FIG. 8A illustrates a view of the flow channel after a period of time of operation, where the substantially horizontal extension conduit 37 may have become partially inoperative due to clogging or degradation, which is expected in the harsh conditions of high temperature glass manufacturing. Embodiment 500 includes third port 541 positioned in the sidewall of flow channel 526 near the molten glass inlet port 542a. Embodiment 500 includes a primary flow or distribution channel 502 fluidly connecting the SC melter (not illustrated) with flow channel 526. Channel 502 comprises a primary flow dam 560 positionable via an aperture 562 in roof 544 of flow channel 526 to block and unblock flow through flow channel 526. Embodiment 500 further includes a first flow channel 504 and a first retractable dam 570 positionable to block and unblock flow in first flow channel 504, and a second flow channel 506 having a second retractable dam 580 positionable to block and unblock flow in second flow channel 506. As in previous embodiments, embodiment 500 includes a device comprising a substantially horizontal retractable extension conduit 37 having at least one aperture 38 (not illustrated) for emitting composition 31. FIG. 8B illustrates an intermediate position, whereby "used" conduit 37 may be retracted as shown by the arrow, while dams 560 and 570 are closed, and dam 580 is opened. Finally, FIG. 8C illustrates the status after a "new" conduit 37 has been installed, and dams 560, 570 open, with dam 580 closed. Note that in FIG. 8C there would theoretically be fewer bubbles and foam downstream of conduit 37 than in the status illustrated in FIG. 8A.

Figure 9A:
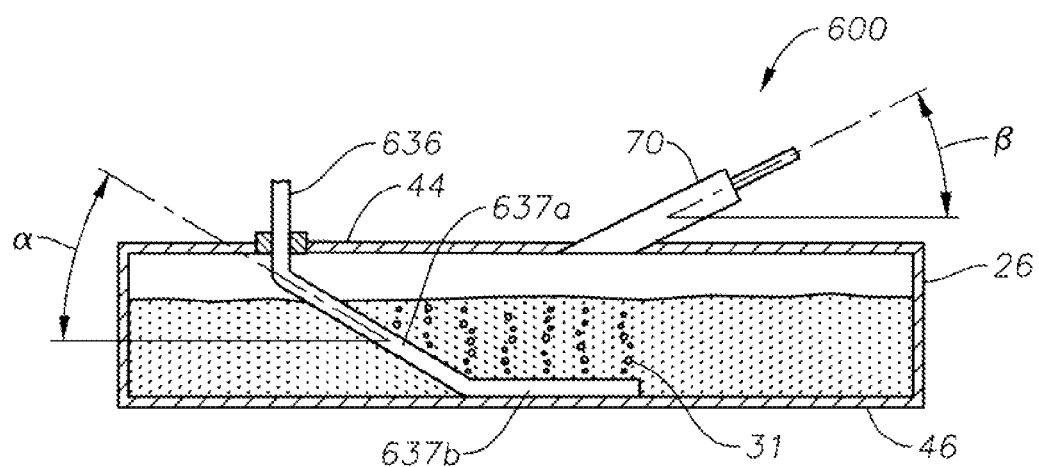
FIGS. 9A and 9B are schematic side elevation views, partially in cross section, of two other apparatus embodiments in accordance with the present invention.
Figure 9B:
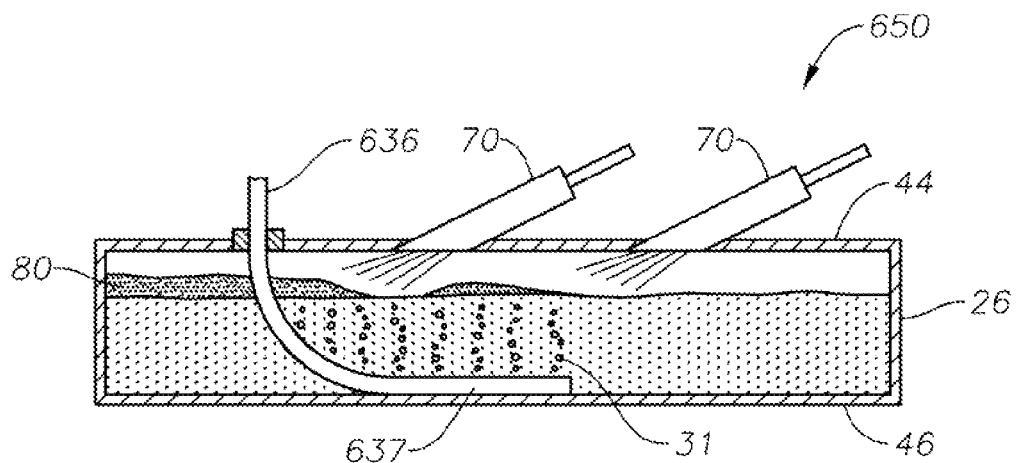
Figure 10A:
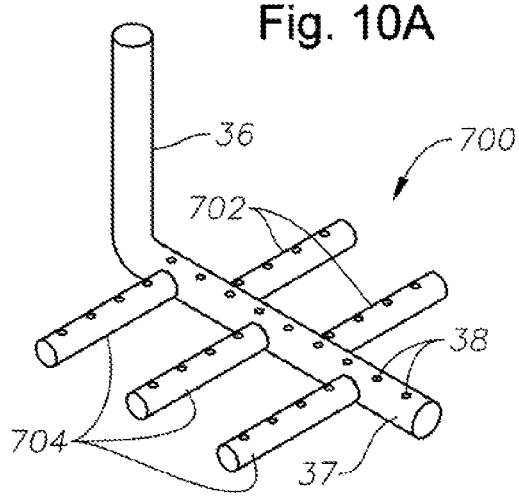
FIGS. 10A-E are embodiments of devices useful in apparatus, systems, and processes of the present disclosure.
Figure 10B:
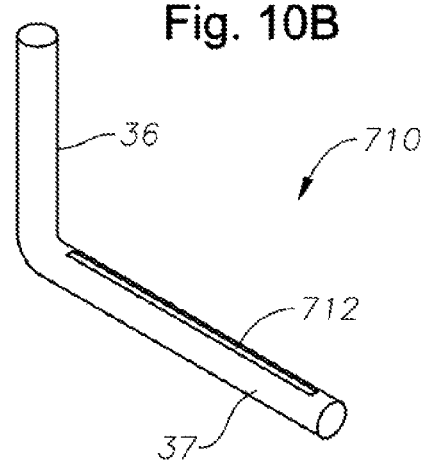
Figure 10C:
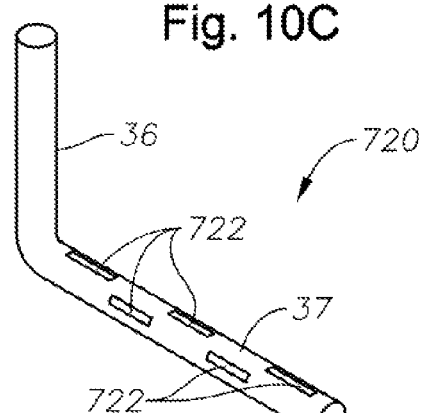
Figure 10D:
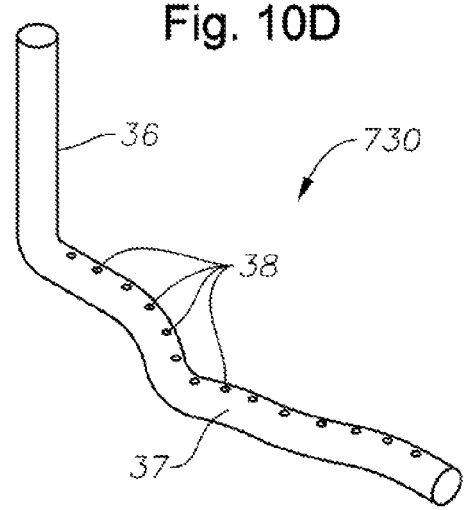
Figure 10E:
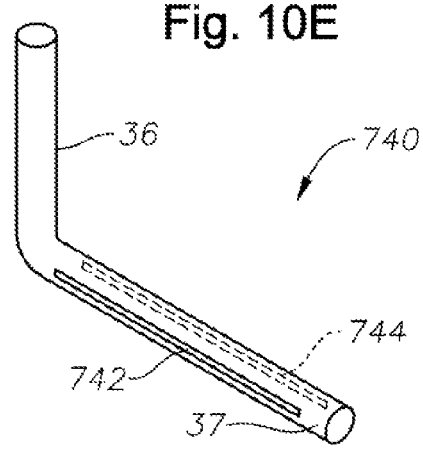

FIGS. 9A and 9B are schematic side elevation views, partially in cross section, of two other flow channel apparatus embodiments 600 and 650 in accordance with the present invention. Embodiment 600 includes a substantially vertical conduit 636 fluidly and mechanically connected to a transitional conduit 637a positioned at an angle α that may vary from 0 to about 45 degrees. Conduit 637a is in turn fluidly and mechanically connected to a substantially horizontal conduit 637b, and either one or both of conduit 637a, 637b may include apertures 38 for emitting composition 31. Also illustrated is a burner 70 positioned through an angle β, which may range from about 20 to about 90 degrees. Embodiment 650 includes a single curved conduit 637 fluidly and mechanically connected to a substantially vertical conduit 636, and illustrates an embodiment with multiple flow channel roof burners 70. Flow channel roof-mounted burners 70 may be high momentum burners designed to physically impinge on any bubbles in bubble layer 80 that do not burst through diffusion effects mentioned herein.

FIGS. 10A-E are non-limiting embodiments of devices useful in apparatus, systems, and processes of the present disclosure. Embodiment 700 may or may not be insertable and removable into a flow channel, but may be more effective in producing the intimate contact between the composition and emitted therefrom and the molten glass and bubbles. Embodiment 700 includes two left-extending conduit 702 and three right-extending conduits 704, each having holes or apertures for emitting composition. Embodiment 710 illustrated schematically in FIG. 10B includes only a single elongated slot 712 in conduit 37 for emitting composition, while embodiment 720 illustrated schematically in FIG. 10C includes a plurality of smaller length slots 722. Embodiment 730 illustrated schematically in FIG. 10D includes a serpentine conduit 37 with a plurality of apertures or orifices 38 for emitting composition. Embodiment 740 illustrated schematically in FIG. 10E includes two or more elongated slots 742, 744, for example positioned on opposite sides of conduit 37. Each of these embodiments, and others, may have advantages in certain situations.

Figure 11:
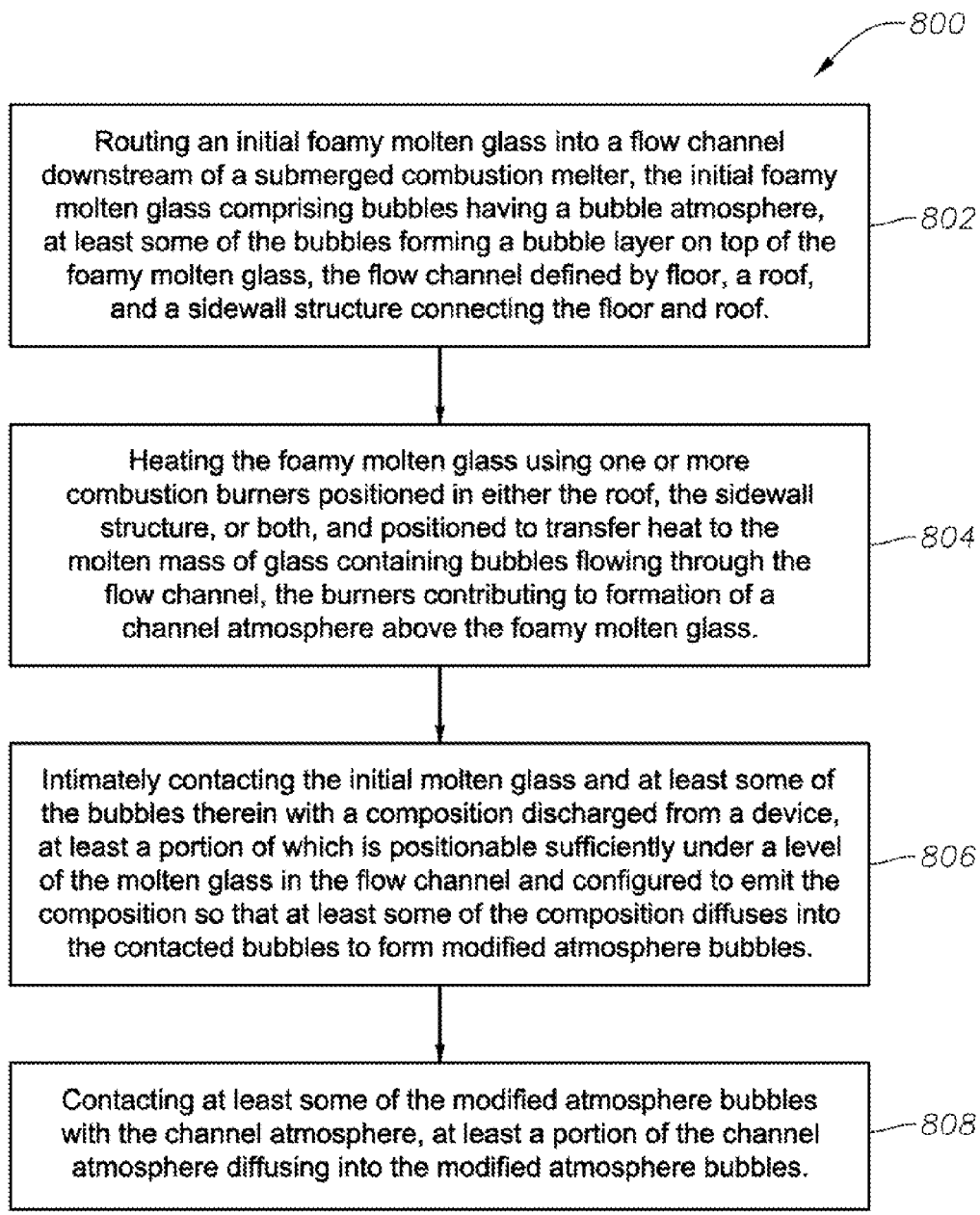
FIGS. 11 and 12 are logic diagrams of two process embodiments of the present disclosure.
Figure 12:
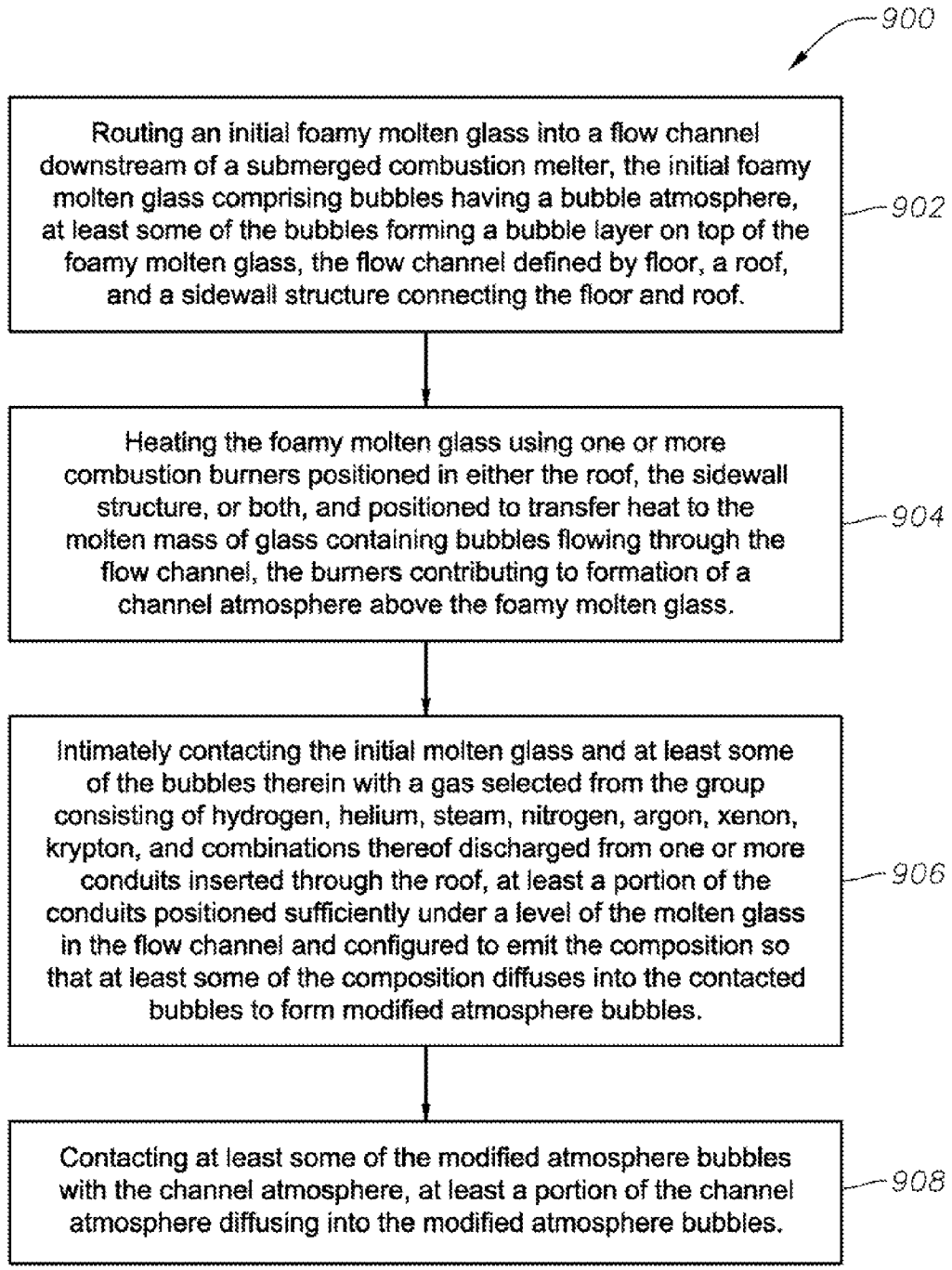

FIGS. 11 and 12 are logic diagrams of two process embodiments 800 and 900 of the present disclosure. Process embodiment 800 includes routing an initial foamy molten glass into a flow channel downstream of a submerged combustion melter, the initial foamy molten glass comprising bubbles having a bubble atmosphere, at least some of the bubbles forming a bubble layer on top of the foamy molten glass, the flow channel defined by floor, a roof, and a sidewall structure connecting the floor and roof (box 802). Process embodiment 800 further includes heating the foamy molten glass using one or more combustion burners positioned in either the roof, the sidewall structure, or both, and positioned to transfer heat to the molten mass of glass containing bubbles flowing through the flow channel, the burners contributing to formation of a channel atmosphere above the foamy molten glass, (box 804). Process embodiment 800 further includes intimately contacting the initial molten glass and at least some of the bubbles therein with a composition discharged from a device, at least a portion of which is positionable sufficiently under a level of the molten glass in the flow channel and configured to emit the composition so that at least some of the composition diffuses into the contacted bubbles to form modified atmosphere bubbles (box 806). Process embodiment also includes contacting at least some of the modified atmosphere bubbles with the channel atmosphere, at least a portion of the channel atmosphere diffusing into the modified atmosphere bubbles (box 808), with the result that at least some of the modified atmosphere bubbles break, either by expanding, contracting, or some expanding to break and other contracting to break.

FIG. 12 illustrates a logic diagram of another process embodiment 900. Process embodiment 9000 includes routing an initial foamy molten glass into a flow channel downstream of a submerged combustion melter, the initial foamy molten glass comprising bubbles having a bubble atmosphere, at least some of the bubbles forming a bubble layer on top of the foamy molten glass, the flow channel defined by floor, a roof, and a sidewall structure connecting the floor and roof (box 902). Process embodiment 900 includes heating the foamy molten glass using one or more combustion burners positioned in either the roof, the sidewall structure, or both, and positioned to transfer heat to the molten mass of glass containing bubbles flowing through the flow channel, the burners contributing to formation of a channel atmosphere above the foamy molten glass (box 904). Process embodiment 900 further includes intimately contacting the initial molten glass and at least some of the SC bubbles therein with a gas selected from the group consisting of hydrogen, helium, steam, nitrogen, oxides of nitrogen, oxides of carbon, oxides of sulfur, argon, xenon, krypton, and combinations thereof discharged from one or more conduits inserted through the roof, at least a portion of the conduits positioned sufficiently under a level of the molten glass in the flow channel and configured to emit the composition so that at least some of the composition diffuses into the contacted bubbles to form modified atmosphere bubbles (box 906). Process embodiment 900 further comprises contacting at least some of the modified atmosphere bubbles with the channel atmosphere, at least a portion of the channel atmosphere diffusing into the modified atmosphere bubbles (box 908), with the result that at least some of the modified atmosphere bubbles break by expanding much, or contract to the point of breaking.

Flow channels of the present disclosure may comprise a roof, floor and sidewall structure comprised of an outer metal shell, non-glass-contact brick or other refractory wall, and glass-contact refractory for those portions expected to be in contact with molten glass. Flow channels may include several sections arranged in series, each section having a roof, floor, and sidewall structure connecting its roof and floor, and defining a flow channel for conditioning molten glass flowing there through. The sections may be divided by a series of skimmers, each extending generally substantially vertically downward a portion of a distance between the roof and floor of the channel, with a final skimmer positioned between a last channel section and a forehearth. The number of sections and the number of skimmers may each be more or less than two. The flow channel may be rectangular as illustrated in the various figures, or may be a shape such as a generally U-shaped or V-shaped channel or trough of refractory material supported by a metallic superstructure.

The flow rate of the foamy or reduced foam molten glass through the flow channel sections will in turn depend on many factors, including the dimensions of flow channel, size of SC melter, skimmer depth into the molten glass, temperature of the melts, viscosity of the melts, and like parameters, but in general the flow rate of molten glass may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

Flow channels of the present disclosure may include one or more high momentum combustion burners positioned immediately upstream, above, and/or or downstream of the conduit for emitting composition in the roof to burst at least some foamed material retained behind a skimmer, or remaining floating on top of a molten mass of glass flowing in the flow channel. High momentum burners may act to heat and/or directly impinge on bubbles. Flow channels may also include one or more low momentum combustion burners in the roof of each section to transfer heat to the molten mass of glass without substantial interference from the foamed material. As noted elsewhere herein, low momentum burners, also referred to as non-impingement burners, may alternately or in addition be positioned in section sidewall structures, or both in section roofs and section sidewall structures.

Flow channel width W of upstream channel sections may be greater than the width of downstream flow channel sections. If N represents the Nth flow channel section in the plurality of sections, in certain embodiments $W_1 > W_2 > W_3 > W_N$, it is preferred that the flow channel width W be as wide as possible to promote long residence times for fining and large surface area for foam to collect (rise from within the molten glass and collect behind skimmers), however, this must be balanced against cost of constructing larger footprint apparatus and systems.

The sidewall structure of each flow channel section preferably has sufficient glass-contact refractory to accommodate the operating depth or level of molten mass of glass, wherein it is understood that level denotes only the general level of liquid molten glass, and not the foam floating or accumulating thereon. In certain embodiments, the sidewall includes glass-contact refractory able to accommodate molten glass depth of no greater than about 10 inches (25.4 cm), in certain other embodiments no greater than about 5 inches (12.7 cm). The floor of each flow channel section may comprise a metal shell, a non-glass contact brick layer, a non-glass contact refractory support or insulating layer, a series of refractory layers, wherein one layer may be a glass-contact refractory layer. Alternatively, there may be an open layer or cavity for flow of a heating (or cooling) fluid. The thicknesses of materials or layers depend on many factors, including the type of glass being produced, the material properties of the materials themselves, temperature and temperature homogeneity of molten glass desired or targeted, and the like.

High momentum burners useful in apparatus, systems, and methods of this disclosure include those disclosed in assignee's patent application U.S. Ser. No. 13/268,130, filed Oct. 7, 2011, which include an oxidant conduit and an inner concentric fuel conduit. Oxidant and fuel supplies for these burners may quick connect/disconnect features, allowing a hose of other source of fuel to be quickly attached to and detached from the conduits. For example, high momentum burner embodiments may comprise a nominal ¼-inch stainless steel Schedule 40 pipe for the fuel conduit and a nominal ¾-inch stainless steel Schedule 40 pipe for the oxidant conduit. Nominal ¼-inch Schedule 40 pipe has an external diameter of 0.54 inch (1.37 cm) and an internal diameter of 0.36 inch (0.91 cm), while nominal ¾-inch Schedule 40 pipe has an external diameter of 1.05 inch (2.67 cm) and internal diameter of 0.82 inch (2.08 cm). The selection of conduit schedule dictates the annular distance between the OD of the inner fuel conduit and the internal diameter (ID) of the oxidant conduit. These dimensions are merely examples, as any arrangement that produces the desired momentum and/or heat will be suitable, and within the skills of the skilled artisan in possession of this disclosure. High momentum burners may be fluid-cooled by employing a third concentric conduit creating an annular region between the oxidant conduit and third conduit.

For high momentum burners burning natural gas, the burners may have a fuel firing rate ranging from about 10 to about 1000 scfh (from about 280 L/hr. to about 28,000 L/hr.); an oxygen firing rate ranging from about 15 to about 2500 scfh (from about 420 L/hr. to about 71,000 L/hr.); a combustion ratio ranging from about 1.5 to about 2.5; nozzle velocity ratio (ratio of velocity of fuel to oxygen at the fuel nozzle tip) ranging from about 0.5 to about 2.5; fuel gas velocity ranging from about 150 to about 1000 ft./sec (from about 46 m/sec to about 300 m/sec); and oxygen velocity ranging from about 150 to about 1000 ft./sec (from about 46 m/sec to about 300 m/sec). Of course these numbers depend on the heating value of the fuel, amount of oxygen in the "oxygen" stream, temperatures and pressures of the fuel and oxidant, and the like, among other parameters. In one typical operation, the high momentum burner would have a combustion ratio of 2.05:1; a velocity ratio of 1; firing rate of natural gas of 500 scfh (14,000 L.hr.) and 1075 scfh (30,400 L/hr.) oxygen; natural gas and oxygen velocities each of 270 ft./sec (80 m/sec); natural gas pressure of 1 psig (6.9 KPa); and oxygen pressure of 0.6 psig (4.1 Kpa), pressures measured at the entrance to the combustion chamber.

Low momentum burners useful in apparatus, systems, and methods of this disclosure may include some of the features of those disclosed in assignee's U.S. patent application Ser. No. 13/268,130, filed Oct. 7, 2011. For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Submerged combustion burners useful in the SC melter apparatus described herein include those described in U.S. Pat. Nos. 4,539,034; 3,170,781; 3,237,929; 3,260,587; 3,606,825; 3,627,504; 3,738,792; 3,764,287; and 7,273,583, and assignee's co-pending patent application U.S. Ser. No. 13/268,028, filed Oct. 7, 2011. The total quantities of fuel and oxidant used by the SC burners in systems of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various SC burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

In certain embodiments the SC burners may be floor-mounted burners. In certain embodiments, the SC burners may be positioned in rows substantially perpendicular to the longitudinal axis (in the melt flow direction) of melter 10. In certain embodiments, the SC burners may be positioned to emit combustion products into molten glass in a melting zone of melter 10 in a fashion so that the gases penetrate the melt generally perpendicularly to the floor. In other embodiments, one or more burners may emit combustion products into the melt at an angle to the floor of melter 10, as taught in assignee's pending U.S. Ser. No. 12/817,754.

Those of skill in this art will readily understand the need for, and be able to construct suitable fuel supply conduits and oxidant supply conduits, as well as respective flow control valves, threaded fittings, quick connect/disconnect fittings, hose fittings, and the like.

High momentum burners and low momentum burners may be mounted to the sidewall structure and/or roof of the flow channel sections using adjustable mounts, such as a ceramic-lined ball turrets, as explained in the afore-mentioned 13/268,130 application.

Submerged combustion melters in system and process embodiments described herein may be any of the currently known submerged combustion melter designs, or may be one of those described in assignee's currently pending patent application U.S. Ser. No. 12/817,754, filed Jun. 17, 2010. Submerged combustion melters useful in the practice of the methods and apparatus of this description may take any number of forms, including those described in assignee's co-pending application U.S. Ser. No. 12/817,754, which describes sidewalls forming an expanding melting zone formed by a first trapezoidal region, and a narrowing melting zone formed by a second trapezoidal region, wherein a common base between the trapezoid defines the location of the maximum width of the melter. Submerged combustion melter 602 may include a roof, side walls, a floor or bottom, one or more submerged combustion burners, an exhaust chute, one or more molten glass outlets, and optionally fluid-cooled panels comprising some or all of the side walls.

Submerged combustion melters may be fed a variety of feed materials by one or more roll stands, which in turn supports one or more rolls of glass mat, as described in assignee's co-pending application U.S. Ser. No. 12/888,970, filed Sep. 23, 2010, incorporated herein by reference. In certain embodiments powered nip rolls may include cutting knives or other cutting components to cut or chop the mat (or roving, in those embodiments processing roving) into smaller length pieces prior to entering melter 602. Also provided in certain embodiments may be a glass batch feeder. Glass batch feeders are well-known in this art and require no further explanation. The initial raw material may include any material suitable for forming molten glass such as, for example, limestone, glass, sand, soda ash, feldspar and mixtures thereof. In one embodiment, a glass composition for producing glass fibers may be "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. applications (Publication Nos. 2007/0220922 and 2008/0276652). The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from the 2007/0220922 application. Notice that during glass melting, carbon dioxide (from lime) and water (from borax) evaporate.

TABLE 1

A typical E-glass batch
BATCH COMPOSITION (BY WEIGHT)

| Raw material | Limestone (Baseline) | Quick-lime | Ca Silicate | Volcanic Glass | Ca Silicate & Volcanic Glass | Quartz-free #1 | Quartz-free #2 | Limestone Slag | Ca Silicate Slag | Quartz-free #3 | Quartz and Clay Free | Ca Silicate/ Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.6% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of CO2@ 1400 C. | 1668 | 0 | 0 | 1647 | 0 | 0 | 0 | 1624 | 0 | 0 | 0 | 0 |

Submerged combustion melters useful in systems and methods in accordance with the present disclosure may also comprise one or more wall-mounted submerged combustion burners, and/or one or more roof-mounted burners. Roof-mounted burners may be useful to pre-heat the melter apparatus melting zone, and serve as ignition sources for one or more submerged combustion burners. Melters having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of particles to the exhaust, one or more roof-mounted burners could be used to form a curtain to prevent particulate carryover. In certain embodiments, one or more submerged combustion burners may be oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain melter embodiments, in certain melter zones, and in the lehr. In certain embodiments the oxy-fuel burners may comprise one or more submerged combustion burners each having co-axial fuel and oxidant tubes forming an annular space there between, wherein the outer tube extends beyond the end of the inner tube, as taught in U.S. Pat. No. 7,273,583, incorporated herein by reference. Burners may be flush-mounted with the melter floor in certain embodiments. In other embodiments, such as disclosed in the '583 patent, a portion of one or more of the burners may extend slightly into the melt above the melter floor.

In certain embodiments, melter side walls may have a free-flowing form, devoid of angles. In certain other embodiments, side walls may be configured so that an intermediate location may comprise an intermediate region of melters having constant width, extending from a first trapezoidal region to the beginning of a narrowing melting region. Other embodiments of suitable melters are described in the above-mentioned '754 application.

As mentioned herein, useful melters may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof, for example; salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Certain embodiments may comprise a process control scheme for the submerged combustion melter and burners. For example, as explained in the '970 application, a master process controller may be configured to provide any number of control logics, including feedback control, feed-forward control, cascade control, and the like. The disclosure is not limited to a single master process controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements and glass mat feeding devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's co-pending application U.S. Ser. No. 13/268,065, filed Oct. 7, 2011, using the vibrations and oscillations of the melter itself, may prove useful predictive control inputs.

Both the melter and flow channel floors and sidewall structures may include a glass-contact refractory lining, as discussed herein. The glass-contact lining may be 1 centimeter, 2 centimeters, 3 centimeters or more in thickness, however, greater thickness may entail more expense without resultant greater benefit. The refractory lining may be one or multiple layers. Glass-contact refractory used in melters and channels described herein may be cast concretes such as disclosed in U.S. Pat. No. 4,323,718. Two cast concrete layers are described in the 718 Patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter and channel refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced. The refractory or refractory-lined channels or troughs described in accordance with the present disclosure may be constructed using refractory cooled panels.

Those having ordinary skill in this art will appreciate that there are many possible variations of the melter, flow channels, burners, and adjustment mechanisms to adjust composition emission into the molten glass, and flow channel atmosphere, and will be able to devise alternatives and improvements to those described herein that are nevertheless considered to be within the claims.

What is claimed is:

1. An apparatus comprising:
   a flow channel defined by a floor, a roof, and a sidewall structure connecting the floor and roof;
   one or more combustion burners positioned in either the roof, the sidewall structure, or both, and positioned to transfer heat to a molten mass of glass containing bubbles having a bubble atmosphere flowing through the flow channel, the burners contributing to formation of a channel atmosphere above the molten glass; and
   a device, at least a portion of which is positionable sufficiently under a level of the molten glass in the flow channel and configured to emit a composition into the molten glass under the level so as to intimately contact the composition with the molten glass and at least some of the bubbles therein, at least some of the composition diffusing into the intimately contacted bubbles to form modified atmosphere bubbles sufficiently different from the channel atmosphere to increase diffusion of a species in the channel atmosphere into the modified atmosphere bubbles, the device comprising a substantially horizontal retractable extension conduit having at least one aperture for emitting the composition,
   wherein when at least some of the modified atmosphere bubbles are subsequently exposed to the channel atmosphere, a portion of the channel atmosphere diffuses into the modified atmosphere bubbles;
   wherein the roof, floor, and sidewall structure defining the flow channel define a substantially linear structure having a length, a width, a proximal end, a distal end, and a longitudinal axis, wherein the length is more than five times the width, wherein the roof comprises a molten glass inlet port near the proximal end and a vent port near the distal end, and wherein the sidewall structure comprises a third port for inserting and removing the device; and
   wherein the third port is positioned in the sidewall near the molten glass inlet port, and the flow channel comprises a primary flow dam positionable to block and unblock flow through the flow channel, the apparatus further comprising a distribution channel fluidly connecting a submerged combustion melter with the flow channel, the distribution channel comprising a first flow channel and a first retractable dam positionable to block and unblock the first flow channel, and a second flow channel having a second retractable dam positionable to block and unblock the second flow channel.

2. The apparatus of claim 1 wherein one or more of the burners are high momentum burners.

3. The apparatus of claim 2 wherein one or more of the high momentum combustion burners are positioned along a centerline of the flow channel in the roof, wherein the high momentum burners have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second).

4. The apparatus of claim 1 wherein the flow channel comprises first and second sections arranged in series, each section having a flow channel width W, wherein $W_1 > W_2$, wherein $W_1$ is the width of the first section, and the first section includes the molten glass inlet port near the proximal end, and wherein $W_2$ is the width of the second section, and second section includes the vent port near the distal end.

5. A system comprising:
   a submerged combustion melter comprising a floor, a roof, a wall structure connecting the floor and roof, a melting zone being defined by the floor, roof and wall structure, and one or more a burners, at least some of which are positioned to direct combustion products into the melting zone under a level of molten glass in the melting zone and form a turbulent molten glass, the melter comprising a batch feeder attached to the wall or roof above the level, and an exit end comprising a melter exit structure for discharging the molten glass, the melter exit structure fluidly and mechanically connecting the melter to a flow channel downstream of the melter, the melter configured to produce an initial foamy molten glass comprising bubbles having a bubble atmosphere, at least some of the bubbles forming a bubble layer on top of the foamy molten glass;
   the flow channel defined by a flow channel floor, a flow channel roof, and a flow channel sidewall structure connecting the flow channel floor and flow channel roof;
   one or more flow channel combustion burners positioned in either the flow channel roof, the flow channel sidewall structure, or both, and positioned to transfer heat to the foamy molten glass containing bubbles flowing through the flow channel, the flow channel burners contributing to formation of a channel atmosphere above the molten glass; and
   a device, at least a portion of which is positionable sufficiently under a level of the molten glass in the flow channel and configured to emit a composition into the foamy molten glass under the level so as to intimately contact the composition with the foamy molten glass and at least some of the bubbles therein, at least some of the composition diffusing into the intimately contacted bubbles to form modified atmosphere bubbles, wherein when at least some of the modified atmosphere bubbles are subsequently exposed to the channel atmosphere, a portion of the channel atmosphere diffuses into the modified atmosphere bubbles, the device comprising a substantially horizontal retractable extension conduit having at least one aperture for emitting the composition;
   wherein the roof, floor, and sidewall structure defining the flow channel define a substantially linear structure having a length, a width, a proximal end, a distal end, and a longitudinal axis, wherein the length is more than five times the width, wherein the flow channel roof comprises a molten glass inlet port near the proximal end and a vent port near the distal end, and wherein the flow channel sidewall structure comprises a third port for inserting and removing the device; and
   wherein the third port is positioned in the flow channel sidewall near the molten glass inlet port, and the flow channel comprises a primary flow dam positionable to block and unblock flow through the flow channel, the apparatus further comprising a distribution channel fluidly connecting the submerged combustion melter with the flow channel, the distribution channel comprising a first flow channel and a first retractable dam positionable to block and unblock the first flow channel, and a second flow channel having a second retractable dam positionable to block and unblock the second flow channel.

6. The system of claim 5 wherein the device comprises materials substantially inert to molten glass compositions and to gases selected from the group consisting of hydrogen, helium, steam, nitrogen, oxides of nitrogen, oxides of carbon, oxides of sulfur, argon, xenon, krypton, and mixtures and combinations thereof.

7. The system of claim 5 wherein at least a portion of the substantially horizontal retractable extension conduit is substantially parallel to a longitudinal axis of the channel.

8. The system of claim 5 wherein at least a portion of the substantially horizontal retractable extension conduit is adjacent the flow channel floor.

9. A process comprising:
   a) routing an initial foamy molten glass into a flow channel downstream of a submerged combustion melter, the initial foamy molten glass comprising bubbles having a bubble atmosphere, at least some of the bubbles forming a bubble layer on top of the initial foamy molten glass, the flow channel defined by a floor, a roof, and a sidewall structure connecting the floor and roof, wherein the roof, floor, and sidewall structure defining the flow channel define a substantially linear structure having a length, a width, a proximal end, a distal end, and a longitudinal axis, wherein the length is more than five times the width, wherein the roof comprises a molten glass inlet port near the proximal end and a vent port near the distal end, and wherein the sidewall structure comprises a third port for inserting and removing a device, the device comprising a substantially horizontal retractable extension conduit having at least one aperture for emitting a composition, and wherein the third port is positioned in the sidewall near the molten glass inlet port, and the flow channel comprises a primary flow dam positionable to block and unblock flow through the flow channel, the apparatus further comprising a distribution channel fluidly connecting the submerged combustion melter with the flow channel, the distribution channel comprising a first flow channel and a first retractable dam positionable to block and unblock the first flow channel, and a second flow channel having a second retractable dam positionable to block and unblock the second flow channel;
   b) heating the initial foamy molten glass using one or more combustion burners positioned in either the roof, the sidewall structure, or both, and positioned to transfer heat to the molten mass of glass containing bubbles flowing through the flow channel, the burners contributing to formation of a channel atmosphere above the foamy molten glass;
   c) intimately contacting the initial foamy molten glass and at least some of the bubbles therein with the composition discharged from the device, at least a portion of which is positionable sufficiently under a level of the molten glass in the flow channel and configured to emit the composition so that at least some of the composition diffuses into the contacted bubbles to form modified atmosphere bubbles, wherein the intimately contacting the initial molten glass and at least some of the bubbles therein with the composition discharged from the device comprises discharging the composition through the substantially horizontal retractable extension conduit inserted through the sidewall structure,
   d) contacting at least some of the modified atmosphere bubbles with the channel atmosphere, at least a portion of the channel atmosphere diffusing into the modified atmosphere bubbles.

10. The process of claim 9 wherein the intimately contacting the initial molten glass and at least some of the bubbles therein with the composition discharged from the device comprises intimately contacting the molten glass with a gas selected from the group consisting of hydrogen, helium, steam, nitrogen, oxides of nitrogen, oxides of carbon, oxides of sulfur, argon, xenon, krypton, and mixtures and combinations thereof.

11. The process of claim 9 comprising positioning the substantially horizontal retractable extension conduit so that at least a portion of the substantially horizontal retractable extension conduit is substantially parallel to the channel.

12. The process of claim 9 comprising positioning the substantially horizontal retractable extension conduit so that at least a portion of the substantially horizontal retractable extension conduit is adjacent the floor of the channel.

13. The process of claim 9 comprising removing the device upon the device becoming damaged, eroded, or plugged without substantially reducing the routing and heating of the foamy molten glass through the channel.

14. A process comprising:
   a) routing an initial foamy molten glass into a flow channel downstream of a submerged combustion melter, the initial foamy molten glass comprising bubbles having a bubble atmosphere, at least some of the bubbles forming a bubble layer on top of the initial foamy molten glass, the flow channel defined by a floor, a roof, and a sidewall structure connecting the floor and roof, wherein the roof, floor, and sidewall structure defining the flow channel define a substantially linear structure having a length, a width, a proximal end, a distal end, and a longitudinal axis, wherein the length is more than five times the width, wherein the roof comprises a molten glass inlet port near the proximal end and a vent port near the distal end, and wherein the sidewall structure comprises a third port for inserting and removing a device, the device comprising a substantially horizontal retractable extension conduit having at least one aperture for emitting a composition, and wherein the third port is positioned in the sidewall near the molten glass inlet port, and the flow channel comprises a primary flow dam positionable to block and unblock flow through the flow channel, the apparatus further comprising a distribution channel fluidly connecting the submerged combustion melter with the flow channel, the distribution channel comprising a first flow channel and a first retractable dam positionable to block and unblock the first flow channel, and a second flow channel having a second retractable dam positionable to block and unblock the second flow channel;
   b) heating the initial foamy molten glass using one or more combustion burners positioned in either the roof, the sidewall structure, or both, and positioned to transfer heat to the molten mass of glass containing bubbles flowing through the flow channel, the burners contributing to formation of a channel atmosphere above the foamy molten glass;
   c) intimately contacting the initial foamy molten glass and at least some of the bubbles therein with a gas selected from the group consisting of hydrogen, helium, steam, nitrogen, oxides of nitrogen, oxides of carbon, oxides of sulfur, argon, xenon, krypton, and mixtures and combinations thereof discharged from the device positioned sufficiently under a level of the molten glass in the flow channel and configured to emit the composition so that at least some of the composition diffuses into the contacted bubbles to form modified atmosphere bubbles; and
   d) contacting at least some of the modified atmosphere bubbles with the channel atmosphere, at least a portion of the channel atmosphere diffusing into the modified atmosphere bubbles.

15. The process of claim 14 comprising adjusting fuel velocity of some of the burners to a value ranging from about 150 ft./second to about 1000 ft./second (about 46 meters/second to about 305 meters/second) and adjusting oxidant velocity to a value ranging from about 150 ft./second to about 1000 ft./second (about 46 meters/second to about 305 meters/second), wherein the fuel and oxidant velocities may be the same or different.

16. The process of claim 14 comprising adjusting fuel velocity of some of the burners to a value ranging from about 6 ft./second to about 40 ft./second (about 2 meters/second to about 12 meters/second) and adjusting oxidant velocity to a value ranging from about 6 ft./second to about 40 ft./second (about 2 meters/second to about 12 meters/second), wherein the fuel and oxidant velocities may be the same or different.

* * * * *